(12) United States Patent  
Smith et al.

(10) Patent No.: US 9,984,496 B1  
(45) Date of Patent: May 29, 2018

(54) TECHNIQUE FOR COMPACT AND ACCURATE ENCODING TRIM GEOMETRY FOR APPLICATION IN A GRAPHICAL PROCESSING UNIT

(71) Applicant: Bentley Systems, Incorporated, Exton, PA (US)

(72) Inventors: George R. Smith, Exton, PA (US); Earlin Lutz, West Chester, PA (US); David Stradley, Madison, AL (US); Mark Schlosser, Reading, PA (US)

(73) Assignee: Bentley Systems, Incorporated, Exton, PA (US)

( * ) Notice: Subject to any disclaimer, the term of this patent is extended or adjusted under 35 U.S.C. 154(b) by 10 days.

(21) Appl. No.: 15/244,811

(22) Filed: Aug. 23, 2016

(51) Int. Cl.
| | |
|---|---|
| *G06T 15/30* | (2011.01) |
| *G06T 15/00* | (2011.01) |
| *G06T 15/04* | (2011.01) |
| *G06T 17/20* | (2006.01) |
| *G06T 17/30* | (2006.01) |

(52) U.S. Cl.
CPC ............ *G06T 15/30* (2013.01); *G06T 15/005* (2013.01); *G06T 15/04* (2013.01); *G06T 17/20* (2013.01); *G06T 17/30* (2013.01)

(58) Field of Classification Search
CPC ..................................................... G06T 17/30
See application file for complete search history.

(56) References Cited

U.S. PATENT DOCUMENTS

| | | | |
|---|---|---|---|
| 5,189,626 A | * | 2/1993 | Colburn ............. G05B 19/4099 |
| | | | 345/420 |
| 5,299,302 A | | 3/1994 | Fiasconaro |
| 5,488,684 A | | 1/1996 | Gharachorloo et al. |
| 5,555,356 A | | 9/1996 | Scheibl |
| 6,707,452 B1 | * | 3/2004 | Veach ..................... G06T 17/20 |
| | | | 345/421 |
| 7,180,523 B1 | | 2/2007 | Macri et al. |
| 8,982,121 B2 | | 3/2015 | Hanniel et al. |

(Continued)

OTHER PUBLICATIONS

Guthe, Michael, et al., "GPU-Based Trimming and Tessellation of NURBS and T-Spline Surfaces," ACM, ACM Transactions on Graphics (TOG)—Proceedings of ACM SIGGRAPH 2005, vol. 24, Issue 3, Jul. 2005, pp. 1-8.

(Continued)

*Primary Examiner* — Kee M Tung  
*Assistant Examiner* — Grace Q Li  
(74) *Attorney, Agent, or Firm* — Cesari and McKenna, LLP; James A. Blanchette

(57) ABSTRACT

In an example embodiment, a technique is provided for encoding trim geometry for application in a GPU. For a UV trim polygon associated with a surface, the UV trim polygon is recursive subdivided into a predetermined number of tiles to produce a set of tiles. Each tile of set of tiles is represented by a value in an array, where the value indicates whether the area of the UV trim polygon corresponding to the tile is entirely solid, is entirely void, or for a case where the tile includes both a solid portion and a void portion, provides an index into an associated linear trim array that stores a trim expression. The set of tiles, and the portions of the linear trim array pointed therefrom, are applied in the GPU to render a trimmed representation of the surface.

22 Claims, 13 Drawing Sheets

(56) References Cited

U.S. PATENT DOCUMENTS

| | | | |
|---|---|---|---|
| 2009/0238443 A1* | 9/2009 | Sato | G06K 9/3216 |
| | | | 382/145 |
| 2010/0079469 A1 | 4/2010 | Lake et al. | |
| 2012/0182297 A1* | 7/2012 | Hanniel | G06T 15/06 |
| | | | 345/421 |
| 2012/0294534 A1* | 11/2012 | Watanabe | G06F 17/5086 |
| | | | 382/195 |
| 2015/0097832 A1* | 4/2015 | Rice | G06T 17/005 |
| | | | 345/424 |
| 2016/0163069 A1* | 6/2016 | Du | G06K 9/00604 |
| | | | 382/243 |

OTHER PUBLICATIONS

Schollmeyer, Andre, et al., "Direct Trimming of NURBS Surfaces on the GPU," ACM Transactions on Graphics (TOG)—Proceedings of ACM SIGGRAPH 2009, vol. 28, Issue 3, Article No. 47, Aug. 2009, pp. 1-9.

Wu, Ruijin, et al., "Correct Resolution Rendering of Trimmed Spline Surfaces," Elsevier, Jul. 21, 2014, pp. 1-9.

* cited by examiner

TECHNIQUE FOR COMPACT AND ACCURATE ENCODING TRIM GEOMETRY FOR APPLICATION IN A GRAPHICAL PROCESSING UNIT

BACKGROUND

Technical Field

The present disclosure relates generally to computer graphics, and more specifically to techniques for compact and accurate encoding of a trim geometry for application in a graphical processing unit (GPU).

Background Information

In modern computer graphics, objects may be modeled using a variety of approaches. One technique involves polygonal modeling, in which a three-dimensional curved surface may be represented by a number of flat polygons. Another approach involves parametrized spline-based modeling. A spline is a curve that that is defined by two or more points, referred to a control points. One specific type of spline is a Basis-spline (B-spline), which is defined by control points that control the shape of the curve. A collection of splines organized as a curvilinear grid (with the two grid directions typically referred to as the U-direction and the V-direction) generates a curved surface, typically referred to as a patch. The topology of such a patch generally is referred to as a UV topology. Multiple patches are often combined via Boolean operators to produce a complex spline surface. Where the splines are B-splines, the spline surface may be referred to as a B-spline surface. FIGS. 1A and 1B are shaded and wireframe diagrams of an example spline surface 100 defined by control points 110 (a selection of which are labeled for purposes of illustration.). The spline surface is parametrically defined by equations that map U and V to values of X, Y and Z in three-dimensional space.

In addition to parametrized spline-based modeling, a variety of other type of parametrized modeling are sometimes employed that map of U and the V to values of X, Y, and Z in three-dimensional space. For example, some approaches employ cylindrical mappings where U represents an angle around a cylinder and V represents a distance along the cylinder's axis. Other approaches employ spherical mappings where U represents a longitude and V represents a latitude. Similarly, still other approaches employ toroidal mappings where U represents an angular position in the direction of a center axis and V represents an angular position around the center axis.

Regardless of the approach, it is common that the produced surfaces are trimmed before they are displayed. Trimming involves cutting a pattern into a surface to remove a portion. One technique for trimming involves defining a polygon in a UV plane (referred to as a UV trim polygon) and wrapping the UV trim polygon onto the surface. Where the UV trim polygon is solid, the surface is retained; where there is a void in the UV trim polygon, the surface is cut away. The effect is that values of U and V for the surface are constrained to remain within the UV trim polygon, rather than allowed to range across the entire parametric range (e.g., 0 to 1 for both U and V).

Traditionally, trimming of surfaces has been implemented in computer systems as pre-processing operations performed on a central processing unit (CPU), rather than on a GPU of a graphics subsystem (e.g., a graphics card). The main reason for this is that trimming typically required the use of irregular mesh data structures that could not be handled by a conventional GPU. However, the involvement of the CPU in these operations hindered graphics performance.

Certain techniques have been developed that permit limited types of trimming to be performed on a GPU. One such GPU-based technique involves representing the UV trim polygon as a binary raster mask having a selected resolution. Each element of the binary raster mask includes a value that indicates solid or void, providing an approximation of the trim geometry. The binary raster mask is provided to the GPU which performs the required trimming based thereon.

While GPU-based techniques involving a binary raster mask offer some advantages over CPU-based techniques, they too suffer notable shortcomings. Since the binary raster mask is composed of elements that are either void or solid, the trim geometry is not fully preserved; detail is lost. One effect of this is that curves will appear jagged rather than smooth.

FIG. 2 is an illustration 200 of a portion of an example surface trimmed using a binary raster mask representation of a UV trim polygon as displayed on a display screen. In this example, the resolution is 512×512 elements. While the surface 200 includes a number of generally circular openings, since only a limited number of elements span each opening (e.g., in this example only 6 elements), the openings do not appear round when displayed on the display screen, but instead appear as blocky approximations. While this issue may be mitigated by increasing the resolution of the binary raster mask to improve the approximation (e.g., such that many more than 6 elements span each opening), increasing resolution increases storage requirements. Uploading a large binary raster mask to a GPU or generating a large binary raster mask on the GPU is costly in terms of display performance.

Further, binary raster masks are typically generated for specific views of a surface, and thereby are not truly view-independent. Should, for example, a view of a limited portion of a surface initially be displayed, and a larger portion of the surface then be displayed, a new binary raster mask may need to be generated. This also is costly in terms of display performance.

Given the shortcomings of existing techniques, there is a need for an improved approach to encoding trim geometry in order to permit fast and accurate GPU-based trimming. It would be desirable for such an approach to be applicable to trimming spline surfaces, as well to other types of surfaces.

SUMMARY

A technique is provided that permits fast and accurate GPU-based trimming, which accurately preserves trim geometry. Such technique may be applicable to trimming spline surfaces, as well as to trimming other types of surfaces.

In an example embodiment, a UV trim polygon associated with a surface (e.g., a patch) is recursive subdivided into a predetermined number of tiles (e.g., 4 tiles) to produce a set of tiles. The recursive subdivision is continued until a condition is satisfied. For example, the condition may be that each tile contains no more than a predetermined number (e.g., 8) vertices of the UV trim polygon or that the set of tiles includes no more than a predetermined number of tiles (e.g., 256×256 tiles). Each tile of the set of tiles is represented by a value in a 2-D array, where the value indicates whether the area of the UV trim polygon corresponding to the tile is entirely solid (e.g., by having the predetermined value of −1), is entirely void (e.g., by having the predetermined value of 0), or for a case where the tile includes both a solid portion and a void portion (i.e., a "trimmed" tile) points to (e.g., provides an index into) an associated linear trim array that stores a trim expression. The trim expression specifies the trim included in the tile, and may be composed of individual trim instructions encoded as planes and operators. The encoding may encode each plane and operator as a color value (e.g., a red green blue alpha (RGBA) value), such that the linear trim array may take the form of a trim texture (e.g., a RGBA texture). The set of tiles, and the portions of the linear trim array pointed therefrom, may be applied in the GPU, and software executing thereon may interpret the information and render a trimmed representation of the surface.

It should be understood that a variety of additional features and alternative embodiments may be implemented other than those discussed in this Summary. This Summary is intended simply as a brief introduction to the reader for the further description which follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION

Figure 3A:
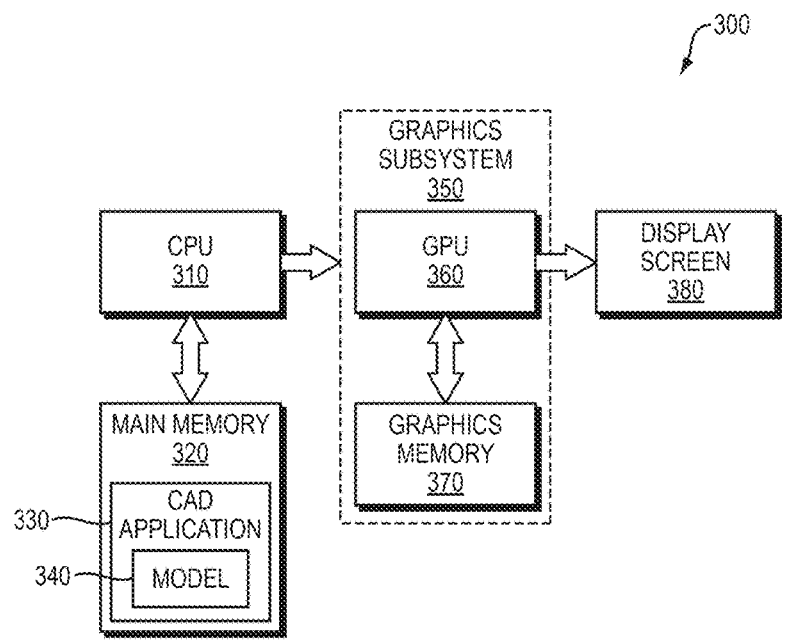
FIG. 3A is a block diagram of graphics hardware of an example electronic device (e.g., an example computer) that may be used with the present techniques.

FIG. 3A is a high-level block diagram of example graphics hardware 300 of an electronic device (e.g., an example computer) that may be used with the present techniques. The graphics hardware 300 includes a central processing unit (CPU) 310 coupled to a main memory 320, such as a Random Access Memory (RAM). Software that produces graphical output may be loaded into main memory 320 from a persistent storage devices (e.g., as a hard disk drive, a solid-state drive, etc.) when needed, and provided to the CPU 310. In one specific implementation, the software may include a computer aided design (CAD) application 330, such as the Microstation® modeling, documentation, and/or visualization application available from Bentley Systems, Inc. of Exton, Pa. that, among many other functions, may display a model 340. The CPU 310 is coupled to the graphics subsystem 350 which may adapted to perform graphics rendering tasks. The graphics subsystem 350 includes a GPU 360 and graphics memory 370, among other components. The graphics memory 370 is typically a specialized type of RAM which provides high performance storage for graphics data. The graphics subsystem 350 is coupled to at least one display screen 380.

Figure 3B:
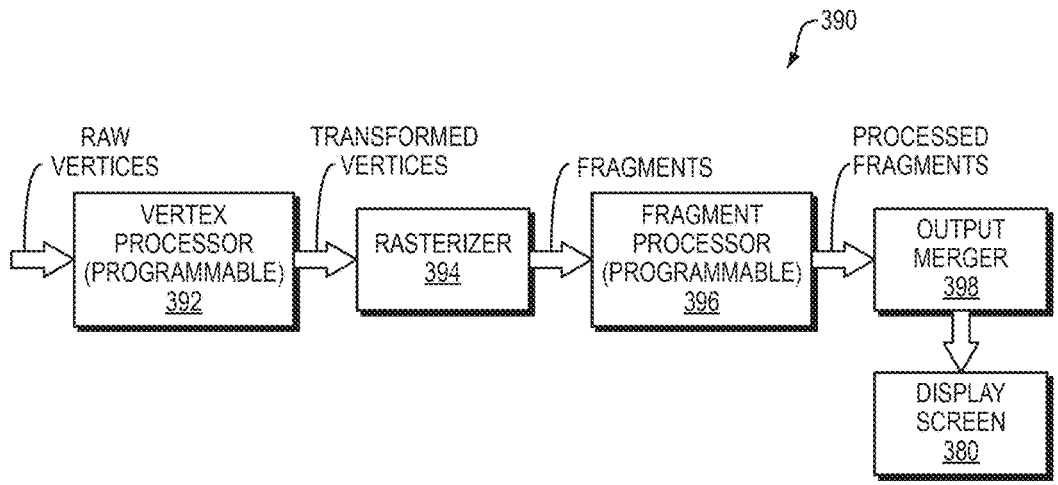
FIG. 3B is a high-level block diagram of an example graphics pipeline that may be implemented by the GPU of FIG. 3A.

FIG. 3B is a high-level block diagram of an example graphics pipeline 390 that may be implemented by the GPU 360. The graphics processing pipeline may accept a description of the model 340 in terms of vertices of primitives and produce color values for pixels to display it on the display screen 380. A vertex processor 392, which includes a programmed vertex shader, processes and transforms individual vertices. A rasterizer 394 receives the transformed vertices and converts each primitive (i.e. connected vertices) into a set of fragments (i.e. pixels in space which are aligned with a pixel grid, and have attributes such as position, color, normal, and/or texture). A fragment processor 396, which includes a programmed fragment shader, receives the fragments and processes individual fragments. An output merger 398 then combines the fragments of all primitives into pixels that are displayed on the display screen 380.

As part of its operation, the graphics pipeline 380 of the GPU 360 may render surfaces of the model 340, for example, complex spline surfaces composed of multiple patches that are combined via Boolean operators. When rendering such surfaces, an improved approach may be utilized to encode trim geometry to permit highly accurate trimming to be conducted using the rendering pipeline 380 on the GPU while minimizing the size of any data structures passed to or generated on the GPU.

Figure 1A:
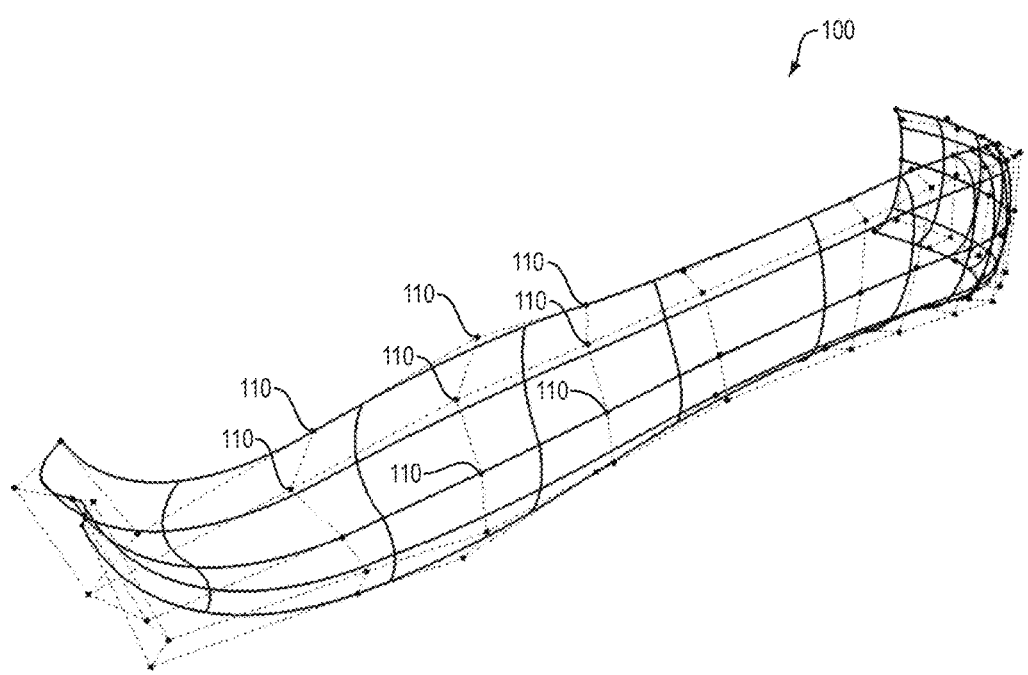
FIGS. 1A and 1B are shaded and wireframe diagrams, respectively, of an example spline surface defined by control points.
Figure 1B:
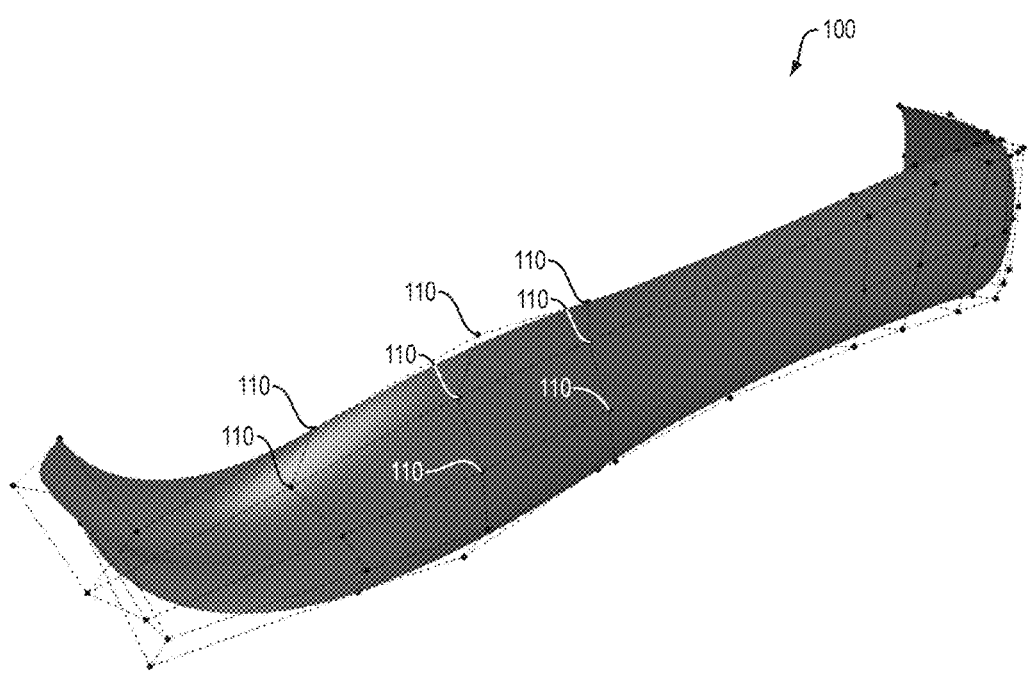
Figure 4:
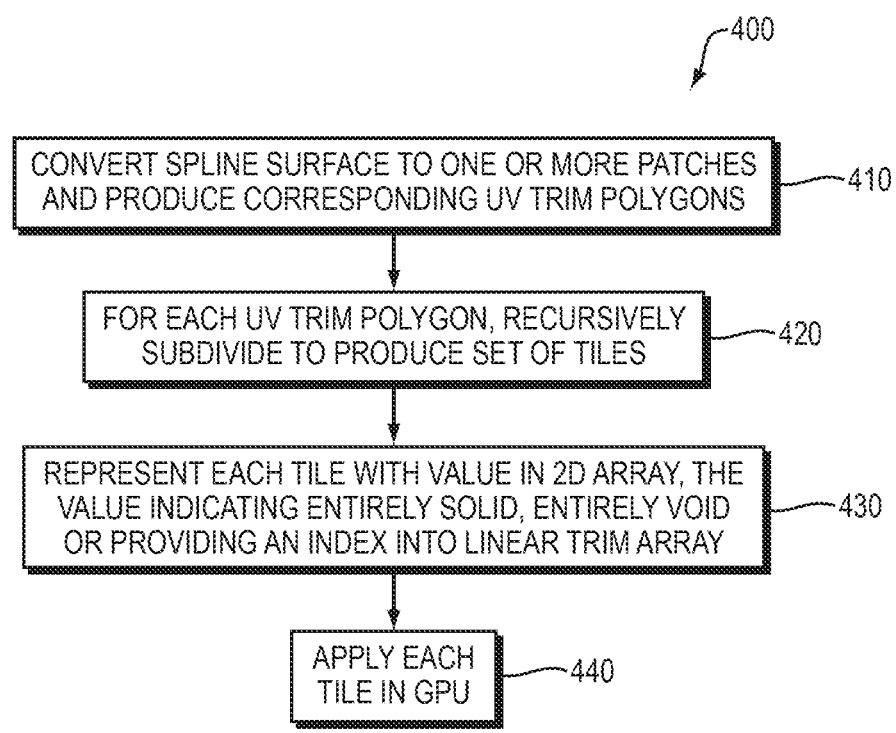
FIG. 4 is a flow diagram of an example sequence of steps that may be executed to conduct GPU-based trimming that accurately preserves trim geometry.
Figure 5:
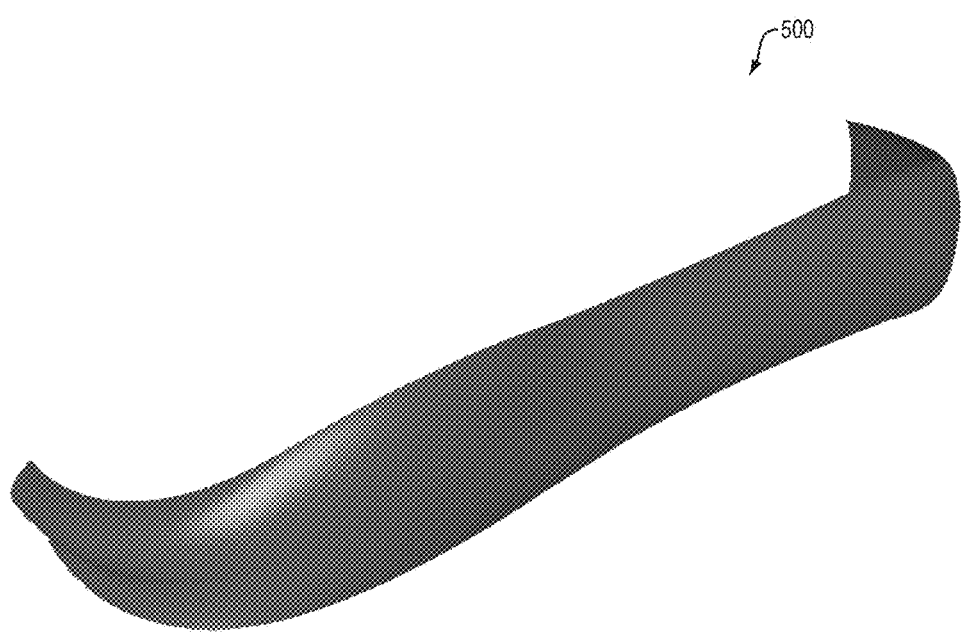
FIG. 5 is a depiction of an example spline surface that may be used to illustrate the operations of FIG. 4.

FIG. 4 is a flow diagram of an example sequence of steps 400 that may be executed to conduct GPU-based trimming that accurately preserves trim geometry. FIG. 5 is a depiction of an example spline surface 500 that may be used to illustrate the operations of FIG. 4. Such surface 500 corresponds to the surface 100 of FIGS. 1A and 1B, with the control points 110 removed. In one case, the surface 500 may correspond to a portion of a model 340 that may be rendered in a UI of the CAD application 340.

Figure 6:
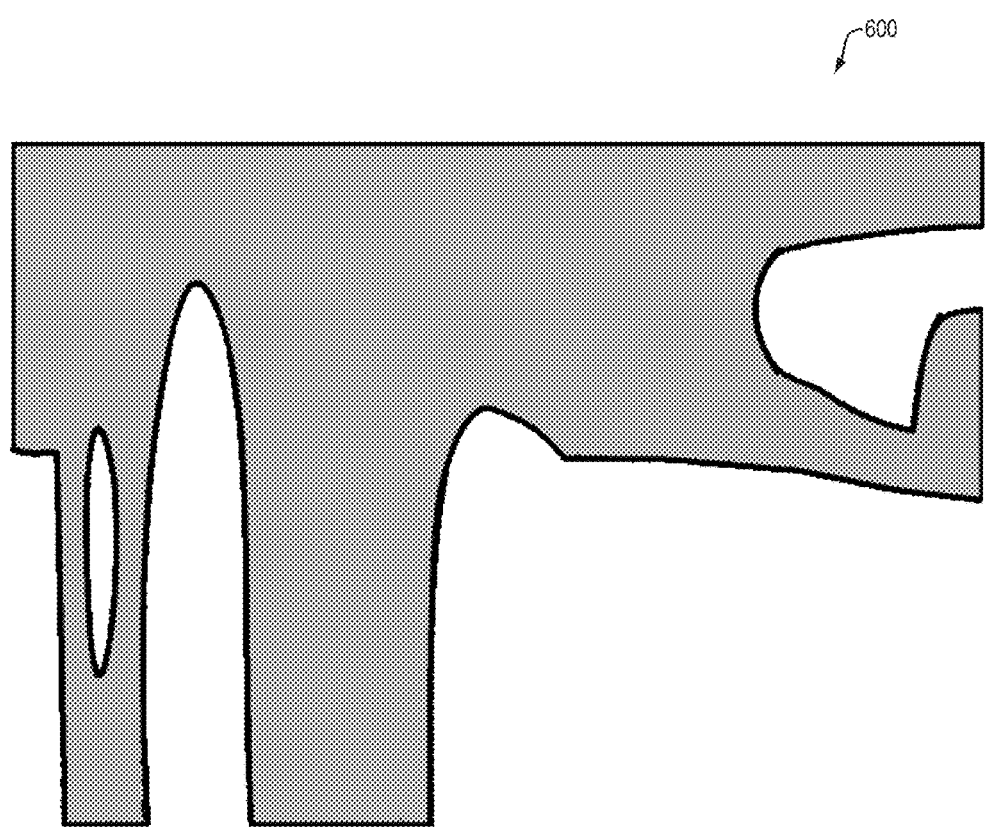
FIG. 6 is a depiction of an example UV trim polygon corresponding to the example surface of FIG. 5.

FIG. 6 is a depiction of an example UV trim polygon 600 for surface 500 that may be used to illustrate the operations of FIG. 4. Where the UV trim polygon 600 is solid indicates the surface 500 should be retained; where there is a void in the UV trim polygon 600 indicates the surface 500 should be cut away. While spline surfaces are used in this example it should be understood that the steps 400 may be readily modified to trim other types of surfaces, including other types of parametrically defined surfaces that map U and V to values of X, Y and Z in three-dimensional space. The general techniques described in the steps 400 are not limited to use with spline surfaces.

Figure 7:
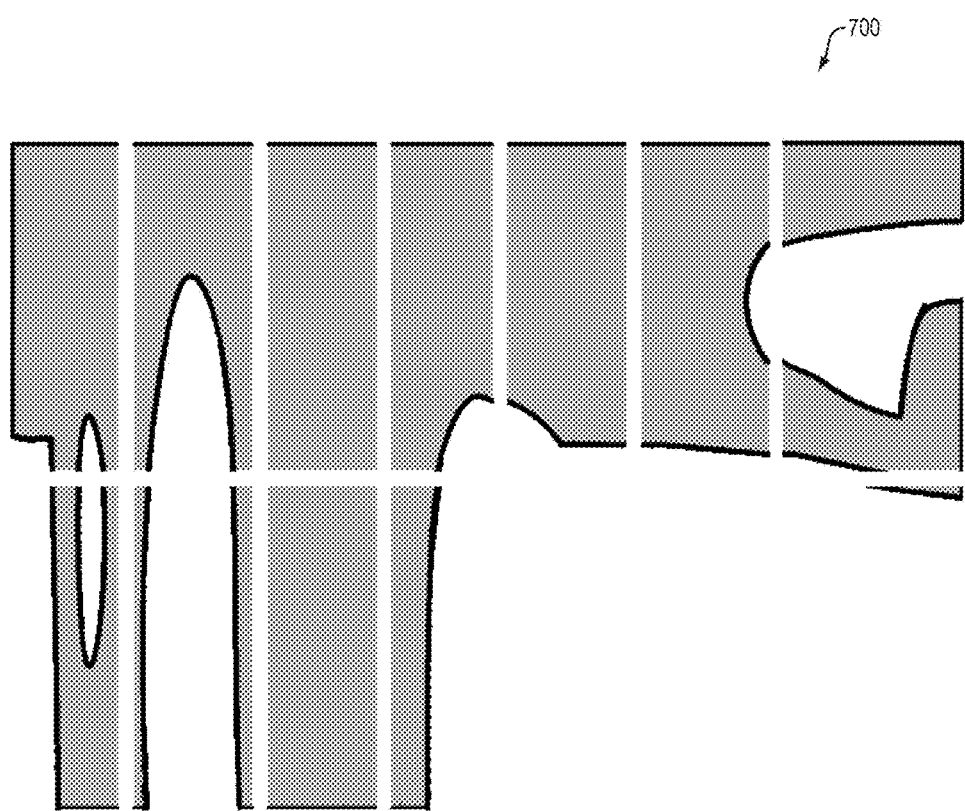
FIG. 7 is a depiction of the example UV trim polygon of FIG. 6 divided at patch boundaries.

At step 410, the spline surface is converted to one or more patches and the UV trim polygon for the overall surface 600 is divided produce a number of UV trim polygons that correspond to the patch boundaries. In certain cases, further sub-division of the spline surface, and production of further corresponding UV trim polygons may be performed as part 410, for example, to maintain sizes within GPU tessellation limits. FIG. 7 is a depiction 700 of the example UV trim polygon 600 of FIG. 6 divided at patch boundaries.

Figure 8:
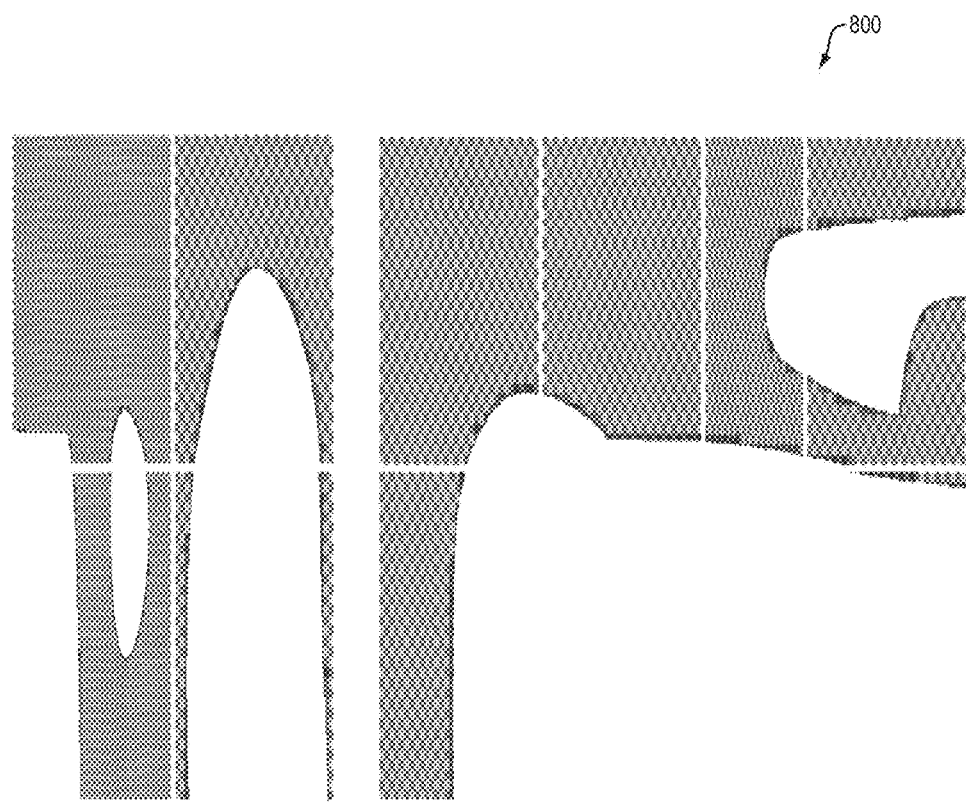
FIG. 8 is a depiction showing tiles that may be generated by operation of a part a step of FIG. 4.

At step 420, for each UV trim polygon corresponding to a patch, the UV trim polygon is recursively subdivided into a predetermined number (e.g., 4) of equal sized, rectangular tiles until a condition is satisfied, thereby producing a set of one or more tiles. An example condition may be that that each tile contains no more than a predetermined number of vertices (e.g., 8 vertices) of the original UV trim polygon or that the resulting set of tiles contains no more than a predetermined number of tiles (e.g., 256×256 tiles). If the original UV trim polygon meets the vertex prong of the condition (e.g., has less than 8 vertices), then a single tile may be returned as the set (e.g., a 1×1 set). Likewise, if the vertex prong of the condition is not met by all tiles through successive subdivision of tiles, a maximum size set may be returned (e.g., a set of 256×256 tiles). When subdivision is complete, each tile of the resulting set of one or more tiles may be entirely solid, entirely void, or "trimmed" (in this context, referring to a tile that has a portion that is solid and a portion that is void divided by a curve that may be defined by vertices). FIG. 8 is a depiction of showing tiles that may be generated by operation of step 420 of FIG. 4. Each of the tiles in FIG. 8 may be entirely solid, entirely void, or "trimmed".

At step 430, each tile of the resulting set of one or more tiles is represented by a value (e.g., a 16 bit value) in a two-dimensional (2D) array. A first predetermined value (e.g., −1) may represent that the tile is entirely solid. Likewise, a second predetermine value (e.g., 0) may represent that the tile is entirely void. If the tile is "trimmed", the value may point to (e.g., be an index into) an associated linear trim array (sometimes referred to as a linear trim list) that includes entries storing a trim expression. In contrast to a binary representation of a tile which would approximate tiles as only entirely solid or entirely void, thereby loosing detail, the ability to also point to an associated linear trim array that stores a trim expression operates to preserves trim geometry.

Figure 9:
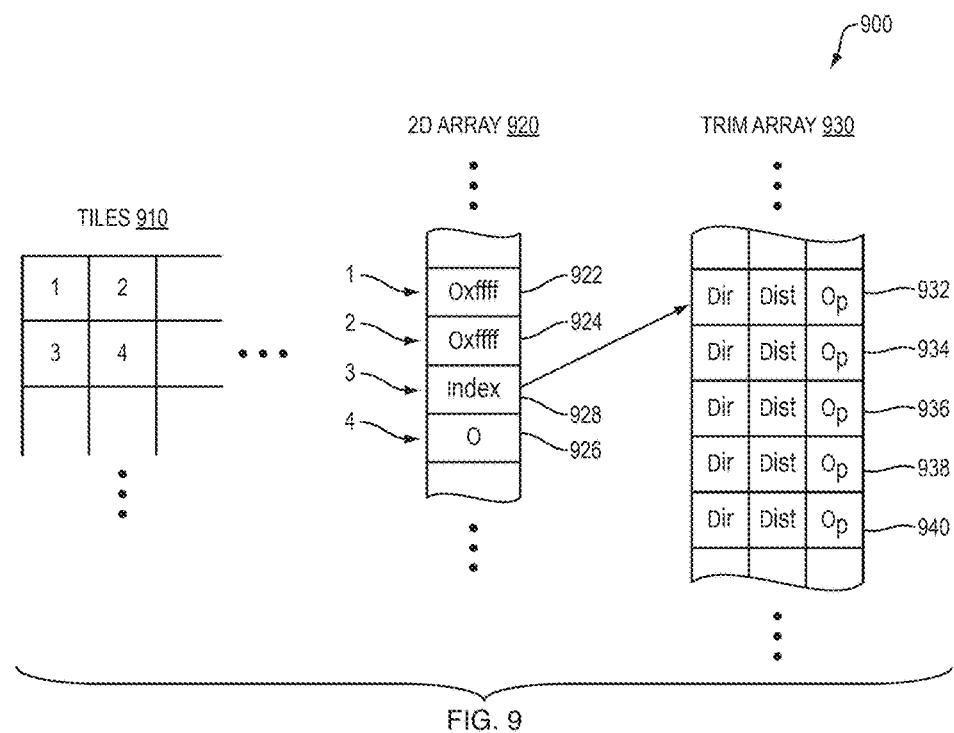
FIG. 9 is a diagram illustrating an example of the relation between tiles, a 2D array and a linear trim array.

FIG. 9 is a diagram 900 illustrating an example of the relation between tiles 910, the 2D array 920 and the linear trim array 930. As can be seen in this example, each tile 910 is represented by a value in the 2D array 920. Some entries 922, 924 of the 2D array 920 store −1 (i.e. 0xffff in hex) to represent the corresponding tile is entirely solid, some entries 924 store 0 to indicate the corresponding tile is entirely void, and some entries 928 store an index into the linear trim array 930, indicating an initial entry 932 of a set of one or more entries 932-940 that form the trim expression that indicates the trim geometry internal to the tile.

The trim expression defines an area to be retained inside the tile and area to be discarded. For example, when fragments (i.e. pixels) of the tile are processed by the GPU (more specifically a fragment shader) of the GPU, the trim expression indicates whether fragment should be retained (and the fragment shader should output a color of the fragment), or the fragment should be discarded. If the trim geometry is convex (referred to as the convex case) the area to be retained may be represented as a set of tile-relative 2D trim planes. If the trim geometry is concave (referred to as the concave case) the area may be triangulated and any trim planes that coincide with the sides of tiles may be discarded.

The trim expression may be represented in a number of different manners, including as a sum of products or as a balanced binary tree. Such representations may then be encoded as a sequence of trim instructions that are stored in linear trim array 930. The encoding may represent the instructions as a plane (represented by a direction and distance) an operator (represented by an opcode). For example, an encoding may concatenate four values: two values that indicate a normalized 2D direction, a value that indicates a distance relative to the size of the tile and a value that indicates the opcode. Such encoding may produce a concatenated value that is in a selected color space (e.g., a RGBA value that is in a RGBA color space). When so encoded into a RGBA color space, the linear trim array 930 may be considered a RGBA trim texture.

Figure 10:
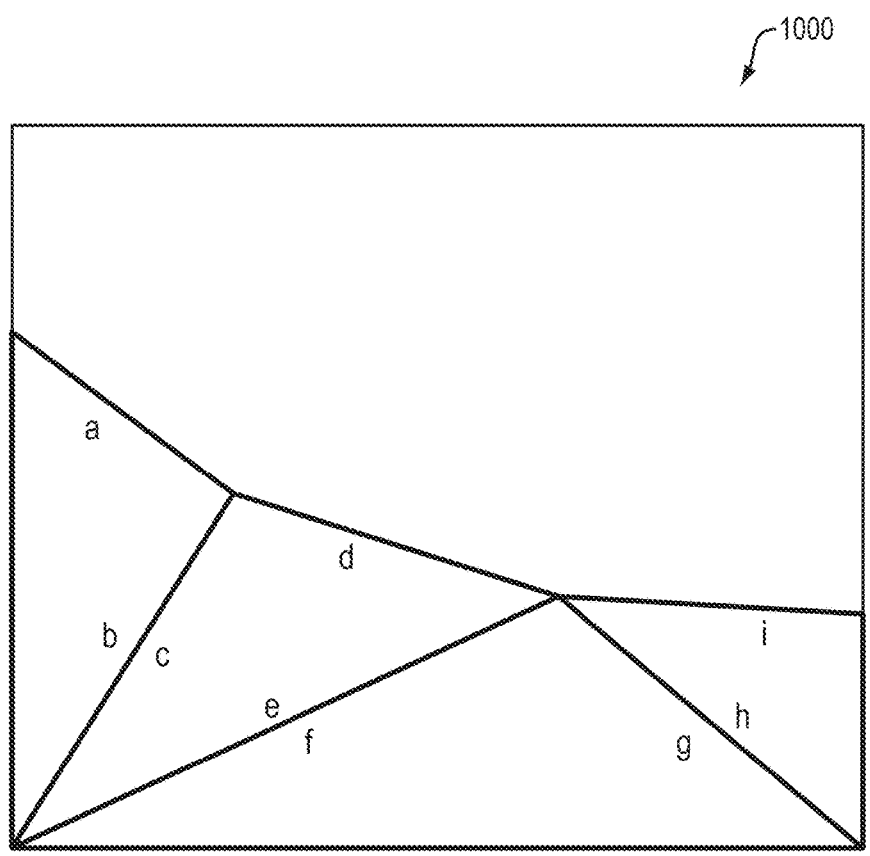
FIG. 10 is an enlargement of one tile of the example set of tiles of FIG. 8, illustrating trim polygons that accurately specify the trim included in the tile.

FIG. 10 is an enlargement of one tile 1000 of the example set of tiles 800 of FIG. 8, illustrating a trim expression that describes an area to be retained inside the tile 1000. The trim expression of FIG. 10 may be represented as a sum of products that indicated whether a fragment should be output or discarded, as:

(a AND b) OR (c AND d AND e) OR (f AND g) OR (h AND i)

where a, b, c, d, e, f, g, h and i each are a plane relative to the center of tile.

Alternatively, the trim expression of FIG. 10 may be represented as the balanced binary tree (shown in pseudocode):

if (fragment inside e) then
  if (inside b) then
    if (fragment inside a) then output else discard
  else
    if (fragment inside d) then output else discard
  else
  if (fragment inside g) then
    output
  else
    if (fragment inside i) then output else discard The sequence of trim instructions for this particular trim expression may be encoded as shown in Table 1 for the case of a sum of products.

TABLE 1

| Instruction Number | Encoded Instruction (Plane, Normal, Opcode=) | Remarks |
|---|---|---|
| 1 | (aDir, aDist, opcode = 6) | If "outside" plane "a", skip 1 instruction |
| 2 | (bDir, bDist, opcode = 0) | If "inside" plane "b", return true |
| 3 | (cDir, cDist, opcode = 7) | If "outside" plane "c" skip 2 instructions |
| 4 | (dDir, dDist, opcode = 6) | If "outside" plane "d" skip 1 instruction |
| 5 | (eDir, eDist, opcode = 0) | If "inside" plane "e" return true |
| 6 | (fDir, fDist, opcode = 6) | If "outside" plane "f" skip 1 instruction |
| 7 | (gDir, gDist, opcode = 0) | If "inside" plane "g" return true |
| 8 | (hDir, hDist, opcode = 6) | If "outside" plane "h" skip 1 instruction |
| 9 | (iDir, iDist, opcode = 0) | If "inside" plane "i" return true | where xDir is a pair of values that indicate a normalized 2D direction, xDist a value that indicates a distance relative to the size of the tile, and the opcode corresponds to known opcode, given in Table 2 below.

TABLE 2

| | |
|---|---|
| opcode = 0 | End of Last Term. Display the fragment if it is inside the trim, else discard the fragment |
| opcode = 1 | End Simple Term. Display the fragment if it is inside the trim, else step 1 to the next instruction |
| opcode = 2 | Clip Tree. If the fragment is inside the trim step M, else step N, where M and N are determined by depth and state. |
| opcode = 4 | In Last Term. Display the fragment if it is inside the trim, else discard the fragment |
| opcode = 6 | In Simple Term. If the fragment is inside the trim step 1, else step 2. |
| opcode = 7 | In Simple Term. If the fragment is inside the trim step 1, else step 3 |

The sequence of trim instructions for the trim expression may be encoded as shown in Table 3 for the case of a balanced binary tree.

TABLE 3

| | |
|---|---|
| 1. | eDir, eDist, opcode = 2 |
| 2. | gDir, gDist, opcode = 2 |
| 3. | bDir, bDist, opcode = 2 |
| 4. | iDir, iDist; opcode = 0 |
| 5. | always true Dir, Dist; opcode = 0 |
| 6. | dDir, dDist), opcode = 0 |
| 7. | aDir, aDist, opcode = 0 | where N is initialized to 1, M is initialized to 2, PC is initialized to 0, and if (opcode==2 and fragment inside trim)

$PC=PC+M$ $M=M*2$ $N=M-1$ if (opcode==2 and fragment outside trim)

$PC+=N$ $N=N*2$ $M=N+1$

The trim instructions of Table 1 or Table 3 are each encoded as concatenated values (e.g., Dist+Dir+opcode) that is in a selected color space (e.g., a RGBA value that is in a RGBA color space) and stored in the linear trim array 930.

Figure 11:
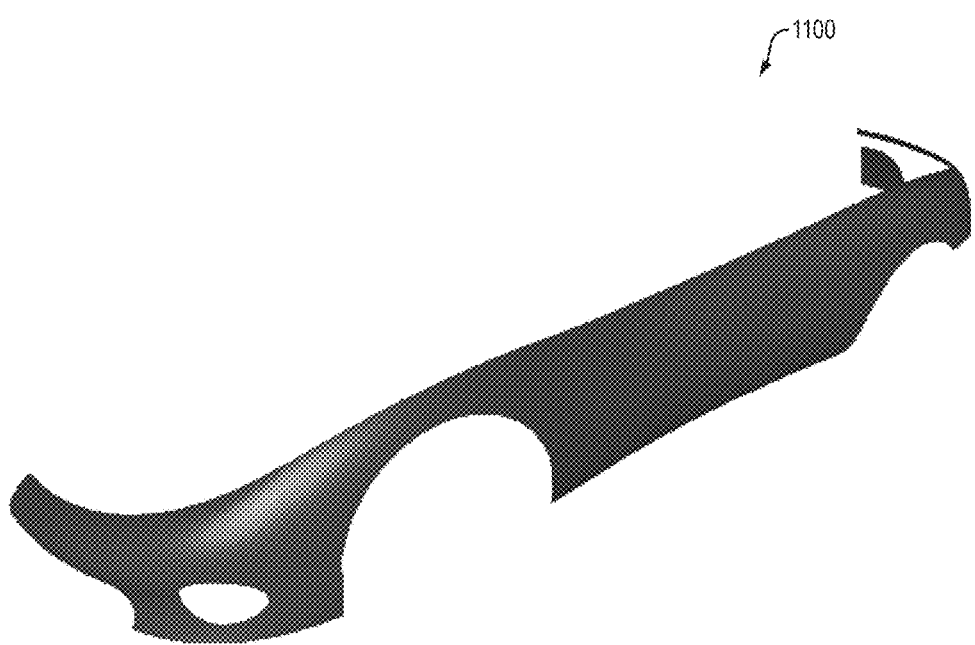
FIG. 11 is a depiction of an example trimmed version of the surface of FIG. 5 that may be output as part of a step of FIG. 4.

Returning to FIG. 4, at step 440, each tile of the set of one or more tiles, the portions of the linear trim array pointed therefrom, is applied in the GPU 350 and software executing thereon may interpret the information and render a trimmed representation of the patch on a display screen 380 of the electronic device 300. In the case of tiles that are trimmed (as indicated by a trim expression encoded in the linear trim array 930 (e.g., the RGBA trim texture), the fragment shader of the GPU may decode the trim expression and limit U and V to remain within the trim polygon. That is, the fragment shader may receive UV coordinates of each fragment, and operates to either discard the fragment or display the fragment, depending on the instructions encoded in the linear trim array 930. For example, referring to Table 1 or Table 3 above, if the instructions returns "true", the fragment satisfies the trim expression, and it is displayed. If the instructions return "false", the fragment does not satisfy the trim expression, and the fragment is discarded. FIG. 11 is a depiction 1100 of an example trimmed version of the surface of FIG. 5 that may be output as part of step 440 of FIG. 4. In contrast to prior binary trim-texture based techniques, curves in the trim topology may appear smooth rather than jagged. This is further illustrated in FIG. 12.

Figure 2:
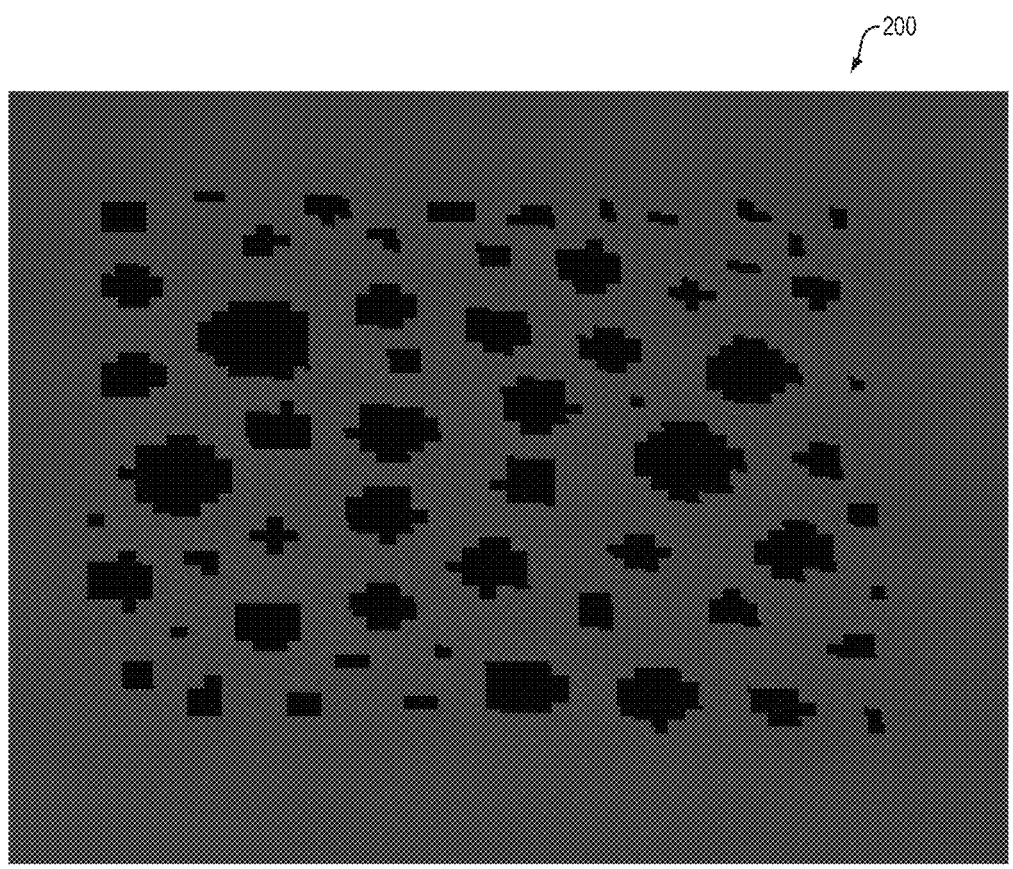
FIG. 2 is an illustration of a portion of an example surface trimmed using a binary raster mask representation of a UV trim polygon as displayed on a display screen.
Figure 12:
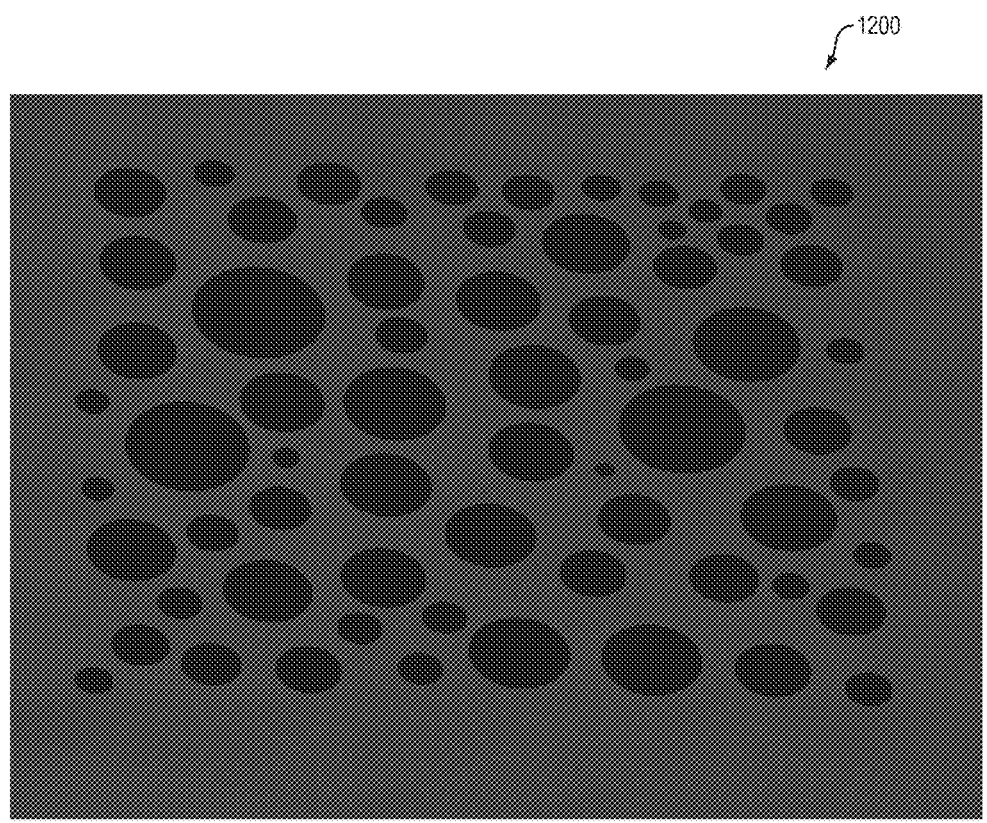
FIG. 12 is an illustration of the same portion of the surface shown in FIG. 2 as displayed on a display screen, trimmed using GPU-based trimming that accurately preserves trim geometry.

FIG. 12 is an illustration 1200 of the same portion of the surface shown in FIG. 2 as displayed on the display screen 360, trimmed using the above described GPU-based trimming technique. As can be seen the generally circular openings actually appear round, rather than jagged.

In addition to improved visual appearance, it should be understood that such an approach may offer a number of performance advantages. For example, such an approach may be view independent. Should, for example, a view of a different portion of a surface be displayed, the 2D array 920 and the linear trim array 930 typically do not need to be entirely regenerated, but rather can be reused.

In summary, the above description details techniques for encoding of trim geometry for application in a GPU. It should be understood that various adaptations and modifications may be readily made to the techniques, to suit various implementations. For example, in addition to the opcodes discussed above, it should be understood that opcodes for complementary representations may be utilized, which may reduce the number of trim instructions required for each tile. Further, the above techniques may be readily modified to support trimming with implicit cubics, to support curved trimming criteria. Finally, the reader is reminded that while spline surfaces are discussed as a specific example of a type of surface that may be trimmed, the techniques may be readily applied to other types of surfaces, including other types of surfaces defined by parametric functions that map U and V to values of X, Y and Z in three-dimensional space that do not involve splines.

In general, it should be understood that at least some of the techniques may be implemented in software, in hardware, or a combination thereof. A software implementation may include computer-executable instructions stored in a non-transitory computer-readable medium. A hardware implementation may include specially configured processors, logic circuits, application specific integrated circuits, and/or other types of hardware components. Further, a combined software/hardware implementation may include both computer-executable instructions stored in a non-transitory computer-readable medium, as well as one or more specially configured hardware components. Above all, it should be understood that the above descriptions are meant to be taken only by way of example.

What is claimed is:

1. A method of encoding trim geometry for application in a graphical processing unit (GPU) of an electronic device, comprising:

associating a UV trim polygon with a surface, the UV trim polygon when wrapped onto the surface indicating a portion of the surface that is to be trimmed;

recursively subdividing the UV trim polygon into a predetermined number of tiles until a condition is satisfied, to produce a set of tiles;

representing each tile of the set of tiles by a value, the value of one or more first tiles of the set indicating an area of the UV trim polygon corresponding to the respective tile is entirely solid, the value of one or more second tiles of the set indicating an area of the UV trim polygon corresponding to the respective tile is entirely void, and the value of one or more third tiles of the set providing an index into an associated trim array that stores a trim expression that specifies a trim included in the respective tile, the trim expression stored as a series of encoded planes and operators that are represented as color values of a texture; and applying each tile of the set of one or more tiles in the GPU to render a trimmed representation of the surface on a display screen of the electronic device.

2. The method of claim 1, wherein the surface is a patch of a complex surface, and the UV trim polygon corresponds with patch boundaries.

3. The method of claim 1, wherein the trim expression is represented as a sum of products that indicates whether a fragment should be displayed or discarded.

4. The method of claim 1, wherein the trim expression is represented as a balanced binary tree that indicates whether a fragment should be displayed or discarded.

5. The method of claim 1, wherein the planes are represented by a normalized direction and a distance relative to a size of the tile.

6. The method of claim 1, wherein the applying further comprises:
  decoding, by a fragment shader of the GPU, the texture to yield the planes and operators of the trim expression; and
  for each of a set of fragments of the tile, either discarding the fragment or displaying the fragment, by the fragment shader, depending on the planes and operators of the trim expression.

7. The method of claim 6, wherein the texture is a red green blue alpha (RGBA) texture and each plane and operator is encoded as a value within a RGBA color space.

8. The method of claim 1, wherein the predetermined number of equal sized tiles is four tiles.

9. The method of claim 1, wherein the condition includes that each tile contain no more than a predetermined number of vertices of the UV trim polygon.

10. The method of claim 1, wherein the condition includes that the set of tiles includes no more than a predetermined number of tiles.

11. The method of claim 1, wherein the value indicating that the tile is entirely solid is a first predetermined value, and the value indicating that the tile is entirely void is a second predetermined value.

12. The method of claim 11, wherein the surface is a spline surface.

13. The method of claim 12, wherein the surface is a surface that is defined by parametric functions that map U and V to values of X, Y and Z in three-dimensional space.

14. An electronic device comprising:
  a display screen;
  a graphics subsystem coupled to the CPU including a graphical processing unit (GPU);
  a CPU in communication with the GPU; and
  one or more memories coupled to the CPU and GPU and configured to store instructions executable on the CPU and GPU, the instructions when executed operable to:
    associate a UV trim polygon with a surface of the model, the UV trim polygon when wrapped onto the surface indicating a portion of the surface that is to be trimmed,
    recursively subdivide the UV trim polygon into a predetermined number of tiles until a condition is satisfied, to produce a set of tiles,
    represent each tile of the set of tiles by a value, the value of one or more first tiles indicating an area of the UV trim polygon corresponding to the respective tile is entirely solid, the value of one or more second tiles of the set indicating an area of the UV trim polygon corresponding to the respective tile is entirely void, and the value of one or more third tiles of the set identifying a respective trim expression that specifies a trim included in the tile, the trim expression encoded as a series of planes and operators that are represented as color values of a texture, and
    apply each tile of the set of tiles in the GPU to render a trimmed representation of the surface on the display screen of the electronic device.

15. The electronic device of claim 14, wherein the value of the one or more third tiles of the set identifies the respective trim expression by providing an index into an associated trim array that stores the trim expression.

16. A non-transitory electronic device-readable medium having executable instructions stored thereon, the instructions when executed on one or more processing units operable to:
  associate a UV trim polygon with a surface, the UV trim polygon when wrapped onto the surface indicating a portion of the surface that is to be trimmed;
  subdivide the UV trim polygon to produce a set of tiles;
  represent each tile of the set of tiles by a value in an array, the value of one or more first tiles of the set indicating the area of the UV trim polygon corresponding to the respective tile is entirely solid, the value of one or more second tiles of the set indicating the area of the UV trim polygon corresponding to the respective tile is entirely void, and the value of one or more third tiles of the set indicating the area identifying a trim expression for one or more trim polygons that specify a trim included in the respective tile, the trim expression encoded a series of planes and operators represented as color values of a texture; and
  apply each tile of the set in a graphical processing unit (GPU) to render a trimmed representation of the surface on a display screen of the electronic device.

17. The non-transitory electronic device-readable medium of claim 16, wherein the value of the one or more third tiles of the set identifies the trim expression by providing an index into an associated trim array that stores the trim expression.

18. The non-transitory electronic device-readable medium of claim 17, wherein the instructions to apply are operable to decode the texture using a fragment shader of the GPU, and for each of a set of fragments of the tile, either discard the fragment or display the fragment, using the fragment shader, depending on the planes and operators of the trim expression.

19. The non-transitory electronic device-readable medium of claim 16, wherein the UV trim polygon corresponds with patch boundaries.

20. The non-transitory electronic device-readable medium of claim 16, wherein the trim expression is represented as a sum of products that indicates whether a fragment should be displayed or discarded or a balanced binary tree that indicates whether a fragment should be displayed or discarded.

21. The non-transitory electronic device-readable medium of claim 16, wherein the surface is a spline surface.

22. The non-transitory electronic device-readable medium of claim 16, wherein the surface is a surface that is defined by parametric functions that map U and V to values of X, Y and Z in three-dimensional space.

* * * * *